(12) United States Patent
Vollert et al.

(10) Patent No.: US 12,151,660 B2
(45) Date of Patent: Nov. 26, 2024

(54) METHOD FOR VENTING A CYLINDER OF A PISTON-CYLINDER UNIT OF A POWER BRAKE PRESSURE GENERATOR OF A HYDRAULIC POWER BRAKE SYSTEM

(71) Applicant: Robert Bosch GmbH, Stuttgart (DE)

(72) Inventors: Herbert Vollert, Vaihingen/Enz (DE); Ralf Kinder, Auenstein (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/550,936

(22) PCT Filed: Jul. 13, 2022

(86) PCT No.: PCT/EP2022/069570
§ 371 (c)(1),
(2) Date: Sep. 15, 2023

(87) PCT Pub. No.: WO2023/016739
PCT Pub. Date: Feb. 16, 2023

(65) Prior Publication Data
US 2024/0294161 A1    Sep. 5, 2024

(30) Foreign Application Priority Data
Aug. 11, 2021   (DE) .................. 10 2021 208 783.3

(51) Int. Cl.
*B60T 17/22* (2006.01)
*B60T 13/66* (2006.01)
*F15B 13/042* (2006.01)

(52) U.S. Cl.
CPC .......... *B60T 17/222* (2013.01); *B60T 13/662* (2013.01); *F15B 13/042* (2013.01)

(58) Field of Classification Search
CPC .... B60T 13/662; B60T 17/221; B60T 17/222; F15B 13/042
See application file for complete search history.

(56) References Cited

U.S. PATENT DOCUMENTS

| 2014/0265547 A1 | 9/2014 | Ganzel |
| 2021/0070267 A1 | 3/2021 | Weh et al. |
| 2021/0188232 A1 | 6/2021 | Mayr et al. |

FOREIGN PATENT DOCUMENTS

| DE | 102016213994 A1 | 2/2018 |
| DE | 102018212850 A1 | 2/2020 |
| DE | 102019201536 A1 | 8/2020 |

OTHER PUBLICATIONS

International Search Report for PCT/EP2022/069570, Issued Nov. 28, 2022.

*Primary Examiner* — Abiy Teka
(74) *Attorney, Agent, or Firm* — NORTON ROSE FULBRIGHT US LLP; Gerard A. Messina

(57) ABSTRACT

Venting a cylinder of a piston-cylinder unit of a power brake pressure generator of a hydraulic power brake system for a motor vehicle. A piston in the cylinder is displaced from a forward-displaced position back into a home position and subsequently forward again. When the piston is displaced back, a connection valve is closed so that the piston sucks brake fluid from a brake fluid container, the brake fluid flowing over a lip seal acting in the manner of a pressure relief valve as the first piston seal. During the forward stroke, the piston pushes brake fluid through the then open connection valve into the brake fluid container. Any air contained in the cylinder is pushed with the brake fluid from the cylinder and separates from the brake fluid in the brake fluid container.

8 Claims, 2 Drawing Sheets

METHOD FOR VENTING A CYLINDER OF A PISTON-CYLINDER UNIT OF A POWER BRAKE PRESSURE GENERATOR OF A HYDRAULIC POWER BRAKE SYSTEM

FIELD

The present invention relates to a method for venting a cylinder of a piston-cylinder unit of a power brake pressure generator of a hydraulic power vehicle brake system.

BACKGROUND INFORMATION

German Patent Application No. DE 10 2019 201 536 A1 describes a hydraulic power vehicle brake system with a manually operable master brake cylinder and a power brake pressure generator comprising a piston-cylinder unit, the piston of which can be displaced by an electric motor via a worm gear in a cylinder of the piston-cylinder unit for power brake pressure generation.

SUMMARY

A method according to the present invention is provided for venting the cylinder of the piston-cylinder unit of the power brake pressure generator of such a power vehicle brake system. In this case, "venting" means removing air from the cylinder of the piston-cylinder unit of the power brake pressure generator. Through a plunger valve in each brake circuit, one or more brake circuits of the vehicle brake system is/are connected to the cylinder of the piston-cylinder unit of the power brake pressure generator, wherein each brake circuit comprises one or more hydraulic wheel brakes. The piston-cylinder unit of the power brake pressure generator of a hydraulic power vehicle brake system is often referred to as a plunger, the cylinder as a plunger cylinder, and the piston as a plunger piston.

The cylinder of the piston-cylinder unit of the power brake pressure generator is connected by a connection valve to a brake fluid container, which is in particular pressureless, wherein "pressureless" means that ambient pressure prevails in the brake fluid container.

The piston of the piston-cylinder unit of the power brake pressure generator is sealed with a first piston seal in the cylinder of the piston-cylinder unit of the power brake pressure generator. The first piston seal acts as a type of pressure relief valve, allowing brake fluid to flow from the brake fluid container between the piston and the cylinder of the piston-cylinder unit into the cylinder in the event of a sufficient negative pressure in the cylinder of the piston-cylinder unit relative to a pressure in the brake fluid container. "Negative pressure" means that a pressure in the cylinder of the piston-cylinder unit of the power brake pressure generator of the vehicle brake system is lower than the pressure in the brake fluid container, wherein, as written, the brake fluid container is in particular pressureless, i.e., ambient pressure prevails in the brake fluid container. In the opposite direction, i.e., in the direction from the cylinder of the piston-cylinder unit of the power brake pressure generator to the brake fluid container, the first piston seal seals up to a maximum pressure that can be generated by the power brake pressure generator or up to a maximum brake pressure that prevails in the vehicle brake system.

Such a piston seal is a lip seal whose sealing lip acts in the manner of a pressure relief valve as explained above and which may be provided as the first piston seal for sealing the piston in the cylinder of the piston-cylinder unit of the power brake pressure generator of the vehicle brake system.

In particular, however, the vehicle brake system does not necessarily comprise a master brake cylinder that can be manually operated by hand or by foot and to which the brake circuit(s) are connected by a first isolating valve in each brake circuit.

In order to vent the cylinder of the piston-cylinder unit of the power brake pressure generator, an example embodiment of the present invention provides to displace the piston of the piston-cylinder unit from a forward-displaced position back in the direction of a home position with the plunger valve(s) closed and the connection valve closed and to displace it thereafter in an opposite direction in the direction of a displacement stroke in the cylinder of the piston-cylinder unit of the power brake pressure generator with the plunger valve(s) closed and the connection valve open. The home position is a position of the piston in the cylinder of the piston-cylinder unit of the power brake pressure generator in which a volume of a chamber that the piston encloses in the cylinder is the largest. When the piston moves in the direction of the displacement stroke in the cylinder, it decreases the volume of the chamber and pushes brake fluid from the cylinder, provided at least one of the valves is open. "Forward-displaced position" means that the piston is displaced somewhat in the direction of the displacement stroke in the cylinder in relation to the home position.

During its return stroke opposite the displacement stroke, from the forward-displaced position in the direction of the home position, with the valves closed, the piston generates a negative pressure in the cylinder of the piston-cylinder unit of the power brake pressure generator. The negative pressure is large enough that the first piston seal is overflowed and brake fluid flows from the brake fluid container between the piston and the cylinder and past the first piston seal into the cylinder of the piston-cylinder unit of the power brake pressure generator. Preferably, the piston is displaced back into the home position in the cylinder, but a shorter return stroke in the direction of the home position is in principle also possible. The return stroke must be large enough that the first piston seal acting as a pressure relief valve is overflowed from the brake fluid container into the cylinder of the piston-cylinder unit of the power brake pressure generator.

During the subsequent displacement of the piston in the cylinder of the piston-cylinder unit of the power brake pressure generator in the direction of the displacement stroke, the piston pushes brake fluid through the connection valve, which is open during this displacement, into the brake fluid container. With the brake fluid, any air present in the cylinder enters the brake fluid container and separates from the brake fluid there. The displacement of the piston in the direction of the displacement stroke may be maximal or shorter than a maximum stroke of the piston in the cylinder. The plunger valve(s) are preferably closed during the displacement of the piston in the direction of the displacement stroke or during the entire performance of the method according to the present invention, in order not to push any air from the cylinder of the piston-cylinder unit of the power brake pressure generator into one of the brake circuits of the vehicle brake system.

According to an example embodiment of the present invention, the method may be repeated several times in order to ensure that all air has been pushed from the cylinder of the piston-cylinder unit of the power brake pressure generator of the vehicle brake system and the cylinder is fully vented.

If the piston of the piston-cylinder unit of the power brake pressure generator is in the home position before or at the beginning of the method according to the present invention, it is displaced into the forward-displaced position in the cylinder as a first or initial method step in one embodiment of the present invention. In this case, the connection valve is open so that the piston pushes brake fluid from the cylinder into the brake fluid container, and the plunger valve(s) are preferably closed so that no brake fluid is pushed from the cylinder of the piston-cylinder unit of the power brake pressure generator into one of the brake circuits of the vehicle brake system. From the forward-displaced position, the piston is then displaced back in the direction of the home position, wherein the connection valve and the plunger valve(s) are or will be closed, as written above.

One example embodiment of the present invention provides for measuring a hydraulic pressure in the cylinder of the piston-cylinder unit during a displacement of the piston in the cylinder in the direction of the displacement stroke with the connection valve closed and the plunger valve(s) closed. A pressure that the piston generates in the cylinder during the displacement in the direction of the displacement stroke with the valves closed is greater when no air is contained in the cylinder. Too low a pressure or too low a pressure increase indicates air in the cylinder. In the event of too low a pressure or pressure increase, this embodiment of the present invention provides for the performance or repetition of the method according to the present invention.

Developments and advantageous embodiments of the present invention are disclosed herein.

All features disclosed in the description herein and the figures can be implemented individually by themselves or in basically any combination in embodiments of the present invention. Embodiments of the present invention that do not comprise all but only one or more features of an embodiment of the present invention are possible in principle.

BRIEF DESCRIPTION OF THE DRAWINGS

The present invention is explained in more detail below with reference to the figures.

DETAILED DESCRIPTION OF EXAMPLE EMBODIMENTS

Figure 1:
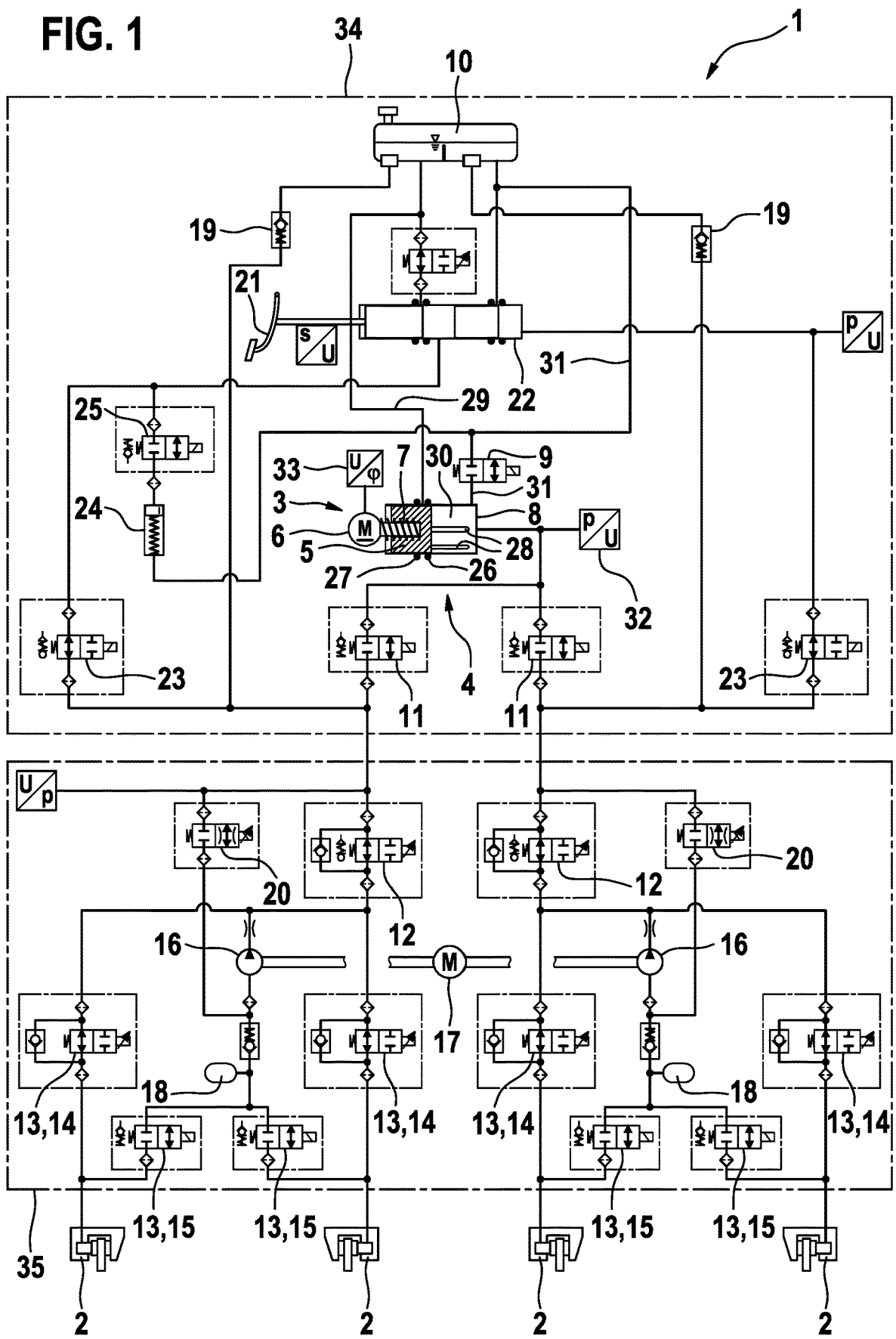
FIG. 1 shows a circuit diagram of a hydraulic power vehicle brake system with which the method according to the present invention can be performed.

The vehicle brake system 1 shown in FIG. 1 is provided for a passenger car with four hydraulic wheel brakes 2 and is designed as a dual-circuit brake system with two hydraulic wheel brakes 2 per brake circuit. Other embodiments are possible, e.g., a single-circuit brake system or a multi-circuit brake system with more than two brake circuits and/or a different number of wheel brakes 2 and/or a different assignment of the wheel brakes 2 to the brake circuits.

The vehicle brake system 1 comprises an electro-hydraulic power brake pressure generator 3 with a piston-cylinder unit 4, whose piston 5 can be displaced axially in a cylinder 8 by means of an electric motor 6 via a worm drive 7 or other rotational/translation/conversion gear in order to generate a brake pressure. The piston-cylinder unit 4 may also be referred to as a plunger unit, and the piston 5 may be referred to as a plunger piston.

The cylinder 8 of the piston-cylinder unit 4 of the power brake pressure generator 3 is connected by a connection valve 9 to a pressureless brake fluid container 10.

The wheel brakes 2 are connected to the power brake pressure generator 3, technically speaking to the cylinder 8 of the piston-cylinder unit 4 of the power brake pressure generator 3, via valves, referred to herein as plunger valves 11, first isolating valves 12 and a brake pressure control valve assembly 13. For division into the two brake circuits, two plunger valves 11 are arranged hydraulically in parallel, two first isolating valves 12 are likewise arranged hydraulically in parallel, and one plunger valve 11 and one first isolating valve 12 are in each case arranged hydraulically in series. Via the brake pressure control valve assembly 13, two wheel brakes 2 are in each case connected via a plunger valve 11 and a first isolating valve 12 to the power brake pressure generator 3.

The brake pressure control valve assembly 13 comprises an inlet valve 14 and an outlet valve 15 for each wheel brake 2. Via the inlet valves 14, the wheel brakes 2 are connected to the first isolating valves 12, namely, two wheel brakes 2 in each brake circuit are connected via one inlet valve 14 each to a first isolating valve 12. Via the outlet valves 15, the wheel brakes 2 are connected to suction sides of hydropumps 16, which can be driven by a common electric motor 17. For each brake circuit, there is one hydropump 16 to the suction sides of which the wheel brakes 2 of the respective brake circuit are connected via the outlet valves 15.

Between the outlet valves 15 and the hydropumps 16, hydraulic accumulators 18 are connected to the suction sides of the hydropumps 16 for intermediate storage of brake fluid, which flows out of the wheel brakes 2 when the outlet valves 15 are opened during a brake pressure control and/or slip control.

The inlet valves 14 and the outlet valves 15 form the brake pressure control valve assembly 13, with which the wheel brake pressures in each wheel brake 2 can be controlled individually. Together with the hydropumps 16, slip controls, in particular an anti-lock, a traction slip, and/or a vehicle dynamics control, are possible. For these slip controls, the abbreviations ABS, ASR and/or FDR are common. Vehicle dynamics controls are also colloquially referred to as "anti-skid controls." Such slip controls are conventional and are not explained further here.

Additionally, the suction sides of the hydropumps 16 are connected by a respective check valve 19 and a respective intake valve 20 to the brake fluid container 10 so that the hydropumps 16 can suck brake fluid from the brake fluid container 10 in order to generate brake pressure or increase brake pressure. The check valves 19 can be flowed through from the direction of the brake fluid container 10 in the direction of the intake valves 20 and the hydropumps 16.

The vehicle brake system 1 comprises a dual-circuit master brake cylinder 22, which can be operated with a brake pedal 21, as a manual brake pressure generator, to which the wheel brakes 2 in each brake circuit are connected via a respective second isolating valve 23, the first isolating valves 12 and the inlet valves 14 of the brake pressure control valve assembly 13 so that the vehicle brake system 1 can also be operated manually. The second isolating valves 23, the first isolating valves 12 and the inlet valves 14 are arranged hydraulically in series. The dual-circuit master brake cylinder 22 may comprise a brake booster (not shown) and may then be referred to as a power-assisted brake pressure generator.

In principle, power operation of the vehicle brake system 1 is provided, wherein brake pressure is generated with the electro-hydraulic power brake pressure generator 3. In the event of a fault or a failure of the electro-hydraulic power brake pressure generator 3, brake pressure generation with the hydropumps 16 of the slip control or optionally with the master brake cylinder 22 is possible. The master brake cylinder 22 essentially serves as a setpoint generator for the wheel brake pressures to be set in the wheel brakes 2 when the electro-hydraulic power brake pressure generator 3 is functional.

In one of the two brake circuits, a pedal displacement simulator 24 is connected via a simulator valve 25 to the master brake cylinder 22. The pedal displacement simulator 24 is a spring-loaded hydraulic accumulator, into which brake fluid from the master brake cylinder 22 can be pushed when the simulator valve 25 is open, so that, during power braking, during which the second isolating valves 23 are closed, a piston in the master brake cylinder 22 can be displaced and the brake pedal 21 can be moved in order to impart a familiar pedal feel to the driver.

The piston 5 in the cylinder 8 of the piston-cylinder unit 4 of the power brake pressure generator 3 of the power brake system 1 is sealed with two piston seals 26, 27, namely, a first piston seal 26 or high-pressure seal and a second piston seal 27 or leakage seal.

In the exemplary embodiment, the first piston seal 26 is a lip seal (FIG. 3), which acts in the manner of a pressure relief valve: In the event of a sufficiently high negative pressure in the cylinder 8 of the piston-cylinder unit 4 of the power brake pressure generator 3 relative to the brake fluid container 10, which is pressureless in the exemplary embodiment, brake fluid flows over the first piston seal 26 and flows between the piston 5 and the cylinder 8 into the cylinder 8. In the opposite direction, i.e., out of the cylinder 8, the first piston seal 26 seals up to a maximum possible pressure in the cylinder 8 or up to a maximum brake pressure in the vehicle brake system 1, i.e., up to a failure of the first piston seal 3. "Negative pressure" means a lower pressure in the cylinder 8 of the piston-cylinder unit 4 of the power brake pressure generator 3 than in the brake fluid container 10. In order for the first piston seal 26, designed as a lip seal, to be overflowed in the direction of the cylinder 8, a pressure difference necessary for the first piston seal 26 to be overflowed must prevail between the pressure in the cylinder 8 and the pressure in the brake fluid container 10.

Figure 3:
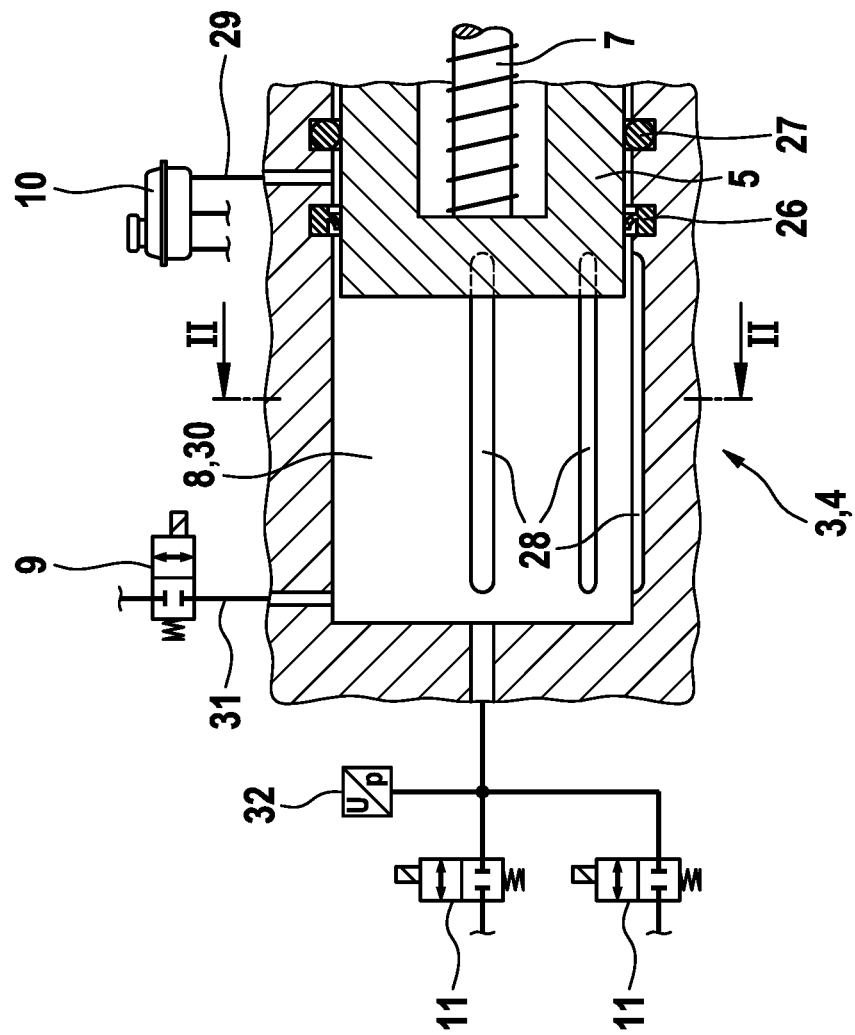
FIG. 3 shows a simplified representation of an axial section of the cylinder of FIG. 2.
Figure 2:
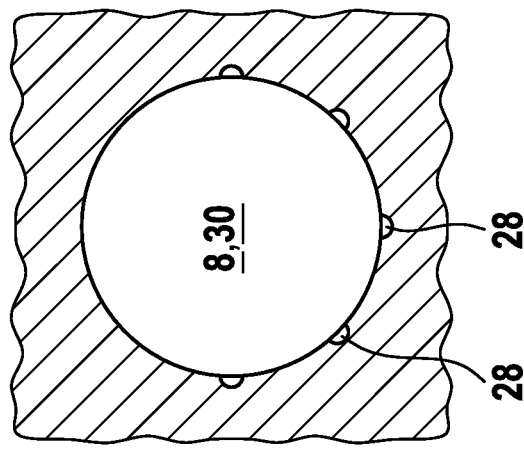
FIG. 2 shows a simplified cross-sectional representation of a cylinder of a piston-cylinder unit of a power brake pressure generator of the vehicle brake system of FIG. 1.

In order to facilitate a flow of the brake fluid, which flows over the first piston seal 26 in the event of a sufficient negative pressure in the cylinder 8 of the piston-cylinder unit 4 of the power brake pressure generator 3, between the piston 5 and the cylinder 8, the cylinder 8 has grooves 28, which extend in a longitudinal direction of the cylinder 8 and almost reach the first piston seal 26, at an inner circumference, as seen in FIGS. 2 and 3. In the exemplary embodiment, the grooves 28 are axially parallel, but they may also extend in the shape of waves or helically at an angle to the axial planes of the cylinder 8, for example.

The second piston seal 27 is an O-ring, for example. Between the first piston seal 26 and the second piston seal 27, a brake line, referred to herein as leakage line 29, opens into the cylinder 8 of the piston-cylinder unit 4 of the power brake pressure generator 3 and connects the cylinder 8 to the pressureless brake fluid container 10.

In the described and illustrated embodiment of the brake system 1, the first isolating valves 12, the inlet valves 14 and the second isolating valves 23 are 2/2-way solenoid valves that are open in their currentless home positions, and the connection valve 9, the plunger valves 11, the outlet valves 15, the intake valves 20 and the simulator valve 25 are 2/2-way solenoid valves that are closed in their currentless home positions. The power brake pressure generator 3, the master brake cylinder 22, the pedal displacement simulator 24, the simulator valve 25, the check valves 19, the plunger valves 11 and the second isolating valves 23 are combined to form a first module, which is referred to herein as a pressure generation module 34, and the electric motor 17 with the hydropumps 16, the first isolating valves 12, the intake valves 20, the inlet valves 14 and the outlet valves 15 are combined to form a second module, which is referred to herein as a pressure control module 35.

In order to vent the cylinder 8 of the piston-cylinder unit 4 of the power brake pressure generator 3, i.e., in order to remove any air contained in the cylinder 8 from the cylinder 8, the method according to the present invention provides to displace the piston 5 from a forward-displaced position back in the direction of a home position and to displace it thereafter in an opposite direction in the direction of a displacement stroke in the cylinder 8. The home position is the position at which the piston 5 is displaced farthest in the direction of a return stroke or an intake stroke in the cylinder 8. In the home position, a volume of a chamber 30, which the piston 5 in the cylinder 8 delimits, is greatest. In the displacement stroke opposite to the return stroke, which may also be referred to as the forward stroke or the working stroke, the piston 5 decreases the volume of the chamber 30 in the cylinder 8 and, when the connection valve 9 is open, pushes brake fluid from the cylinder 8 into the brake fluid container 10. In the forward-displaced position, the piston 5 is displaced from the home position somewhat in the direction of the displacement stroke in the cylinder 8.

When the piston 5 is displaced from the forward-displaced position back in the direction of the home position, the two plunger valves 11 and the connection valve 9 are closed. As a result, the piston 5 generates a negative pressure in the cylinder 8 during its displacement in the direction of the home position. A displacement path of the piston 5 in the direction of the home position is of such a length that the negative pressure generated in the cylinder 8 is sufficient for brake fluid to flow over the first piston seal 26 operating in the manner of a pressure relief valve, i.e., brake fluid flows from the brake fluid container 10 through the leakage line 29 into the cylinder 8 of the piston-cylinder unit 4 of the power brake pressure generator 3. The piston 5 may be displaced up to the home position or also not up to the home position. As written, the displacement path of the piston 5 must be of such a length that the negative pressure generated in the cylinder 8 causes the first piston seal 26 to be overflowed from the brake fluid container 10 into the cylinder 8.

During the subsequent displacement of the piston 5 in the direction of the displacement stroke, the plunger valves 11 remain closed so that brake fluid, which may contain air, is not pushed from the cylinder 8 of the piston-cylinder unit 4 of the power brake pressure generator 3 into the brake circuits. The connection valve 9 is opened so that the piston 5 pushes brake fluid from the cylinder 8 into the brake fluid container 10. Any air present in the cylinder 8 is pushed with the brake fluid from the cylinder 8 into the brake fluid container 10, where it separates from the brake fluid.

In the intended installation and usage position of the power brake pressure generator 3 and its cylinder 8, a brake line 31 connecting the cylinder 8 of the piston-cylinder unit 4 of the power brake pressure generator 3 to the connection valve 9 opens into the cylinder 8 at the top, where any air present in the cylinder 8 collects, so that during the displacement of the piston 5 in the direction of the displacement stroke, the air is pushed from the cylinder 8 through the brake line 31 and the open connection valve 9 into the brake fluid container 10.

The method may be repeated several times in order to reliably remove all air present in the cylinder 8 of the piston-cylinder unit 4 of the power brake pressure generator 3 from the cylinder 8.

If the piston 5 is in the home position, it is displaced into the forward-displaced position in order to vent the cylinder 8 of the piston-cylinder unit 4 of the power brake pressure generator 3 of the power brake system 1, before it is again displaced from the forward-displaced position back in the direction of the home position. During the displacement of the piston 5 from the home position into the forward-displaced position, the plunger valves 11 remain or are preferably closed so that brake fluid, which may contain air, is not pushed from the cylinder 8 of the piston-cylinder unit 4 of the power brake pressure generator 3 into the brake circuits of the power brake system 1. The connection valve 9 is opened so that the piston 5 can push brake fluid from the cylinder 8 into the brake fluid container 10. During the displacement of the piston 5 back in the direction of the home position, the plunger valves 11 remain closed, as explained above, and the connection valve 9 is closed.

The venting according to the present invention of the cylinder 8 of the piston-cylinder unit 4 of the power brake pressure generator 3 of the power brake system 1 can be performed, for example, at certain points in time, at defined intervals, or as a function of other criteria.

According to the present invention, an "elasticity test" of the brake fluid in the cylinder 8 of the piston-cylinder unit 4 of the power brake pressure generator 3 is also possible. For this purpose, the piston 5 is displaced in the direction of the displacement stroke in the cylinder 8 with the plunger valves 11 closed and the connection valve 9 closed. If the brake fluid in the cylinder 8 does not contain any air, it is nearly incompressible, as a result of which a pressure in the cylinder 8 increases quickly and to a high value during the displacement of the piston 5; the displacement of the piston 5 is short in this case. The pressure or the pressure increase in the cylinder 8 can be measured with a pressure sensor 32 connected to the cylinder 8, and a rotation of the electric motor 6, instead of a displacement path of the piston 5, can be measured with a rotation angle sensor 33. If the pressure increase is low and the piston 5 can be displaced far in the cylinder 8, it must be assumed that air is in the cylinder 8. In this case, the cylinder 8 is vented as described above.

The described elasticity test of the brake fluid in the cylinder 8 of the piston-cylinder unit 4 of the power brake pressure generator 3 can also be performed after a venting cycle, i.e., after a displacement of the piston 5 in the direction of the home position and a subsequent displacement of the piston 5 in the direction of the displacement stroke, and if the brake fluid continues to be compressible, a further venting cycle can be performed.

The invention claimed is:

1. A method for venting a cylinder of a piston-cylinder unit of a power brake pressure generator of a hydraulic power brake system, wherein the cylinder of the piston-cylinder unit of the power brake pressure generator is connected by a plunger valve to a brake circuit of the power brake system and by a connection valve to a brake fluid container, and wherein a piston of the piston-cylinder unit in the cylinder of the piston-cylinder unit is sealed with a first piston seal, which can be overflowed from the brake fluid container into the cylinder of the piston cylinder unit of the power brake pressure generator in the manner of a pressure relief valve in the event of a negative pressure in the cylinder of the piston-cylinder unit of the power brake pressure generator relative to a pressure in the brake fluid container, the method comprising the following steps:

displacing, with the plunger valve closed and the connection valve closed, the piston of the piston-cylinder unit of the power brake pressure generator from a forward-displaced position back in a direction of a home position, wherein the piston generates a negative pressure in the cylinder of the piston-cylinder unit of the power brake pressure generator in such a way that brake fluid is sucked from the brake fluid container, flows over the first piston seal and flows into the cylinder of the piston-cylinder unit of the power brake pressure generator; and subsequently displacing again, with the connection valve open and the plunger valve closed, the piston forward in a direction of a displacement stroke in the cylinder of the piston-cylinder unit of the power brake pressure generator, so that brake fluid is pushed from the cylinder of the piston-cylinder unit of the power brake pressure generator through the open connection valve into the brake fluid container.

2. The method according to claim 1, wherein the method is repeated.

3. The method according to claim 1, wherein, when the piston of the piston-cylinder unit of the power brake pressure generator is in the home position, the plunger is displaced into the forward-displaced position with the connection valve open and the plunger valve closed, before it is displaced back in the direction of the home position in the cylinder of the plunger cylinder unit of the power brake pressure generator with the plunger valve closed and the connection valve closed.

4. The method according to claim 1, wherein, with the plunger valve closed and the connection valve closed, the piston of the piston-cylinder unit of the power brake pressure generator is displaced in the direction of the displacement stroke, a hydraulic pressure in the cylinder of the piston-cylinder unit of the power brake pressure generator is measured and the steps are performed or repeated when the pressure is too low.

5. The method according to claim 1, wherein the first piston seal includes a lip seal, a sealing lip of which acts in the manner of a pressure relief valve and which can be overflowed from the brake fluid container into the cylinder in the event of a negative pressure in the cylinder of the piston-cylinder unit of the power brake pressure generator relative to a pressure in the brake fluid container and which can seal against a flow from the cylinder into the brake fluid container between the piston and the cylinder of the piston-cylinder unit of the power brake pressure generator.

6. The method according to claim 1, wherein the cylinder of the piston-cylinder unit of the power brake pressure generator is connected to the brake fluid container via the first piston seal through a different brake line than via the connection valve.

7. The method according to claim 1, wherein the cylinder of the piston-cylinder unit of the power brake pressure generator has a groove, which extends in an axial direction of the cylinder at an inner circumference of a chamber of the cylinder delimited by the piston in the cylinder and through which brake fluid can flow between the piston and the cylinder and which ends at a small distance from the first piston seal.

8. The method according to claim 1, wherein a brake line connecting the connection valve to the cylinder of the piston-cylinder unit of the power brake pressure generator opens into the cylinder at a top in a usage position of the piston-cylinder unit.

\* \* \* \* \*